United States Patent [19]
Watters

[11] Patent Number: 5,762,026
[45] Date of Patent: Jun. 9, 1998

[54] TOP FOR ANIMAL AND PLANT ENCLOSURE

[75] Inventor: Jeffrey R. Watters, Rowlett, Tex.

[73] Assignee: Oceanic Systems, Inc., Dallas, Tex.

[21] Appl. No.: 734,194

[22] Filed: Oct. 21, 1996

[51] Int. Cl.$^6$ ........................................ A01K 63/00
[52] U.S. Cl. ................ 119/452; 119/246; 119/470; 119/265
[58] Field of Search ........................ 119/452, 246, 119/265, 470, 266, 418

[56] References Cited

U.S. PATENT DOCUMENTS

| | | | |
|---|---|---|---|
| 2,898,884 | 8/1959 | Messersmith | 119/452 X |
| 3,297,001 | 1/1967 | Locke et al. | 119/470 |
| 3,721,212 | 3/1973 | Groth | 119/266 |
| 3,913,526 | 10/1975 | Hall | 119/266 |
| 4,029,048 | 6/1977 | Gershbein | 119/165 |
| 4,291,494 | 9/1981 | Knablein et al. | 47/17 |
| 4,913,811 | 4/1990 | Huang et al. | 210/169 |
| 5,000,117 | 3/1991 | Gordon | 119/265 |
| 5,000,118 | 3/1991 | Merritt et al. | 119/246 |
| 5,009,189 | 4/1991 | Neff | 119/452 X |
| 5,009,190 | 4/1991 | Gordon | 119/265 |
| 5,255,811 | 10/1993 | Simon | 119/265 |
| 5,363,801 | 11/1994 | Watters et al. | 119/452 |
| 5,370,081 | 12/1994 | Gordon | 119/265 |
| 5,408,955 | 4/1995 | Tsuchiya | 119/266 |

FOREIGN PATENT DOCUMENTS 3907-686-A  3/1989  Germany.

Primary Examiner—Gene Mancene
Assistant Examiner—Yvonne R. Abbott
Attorney, Agent, or Firm—Martin Korn

[57] ABSTRACT

An enclosure for animals and plants includes a bottom and a side wall. The wall and bottom are interconnected to form a unitary structure. A top for the unitary structure includes a glass portion and a screen portion. Structure is provided for selectively locking the top to the unitary structure.

3 Claims, 1 Drawing Sheet

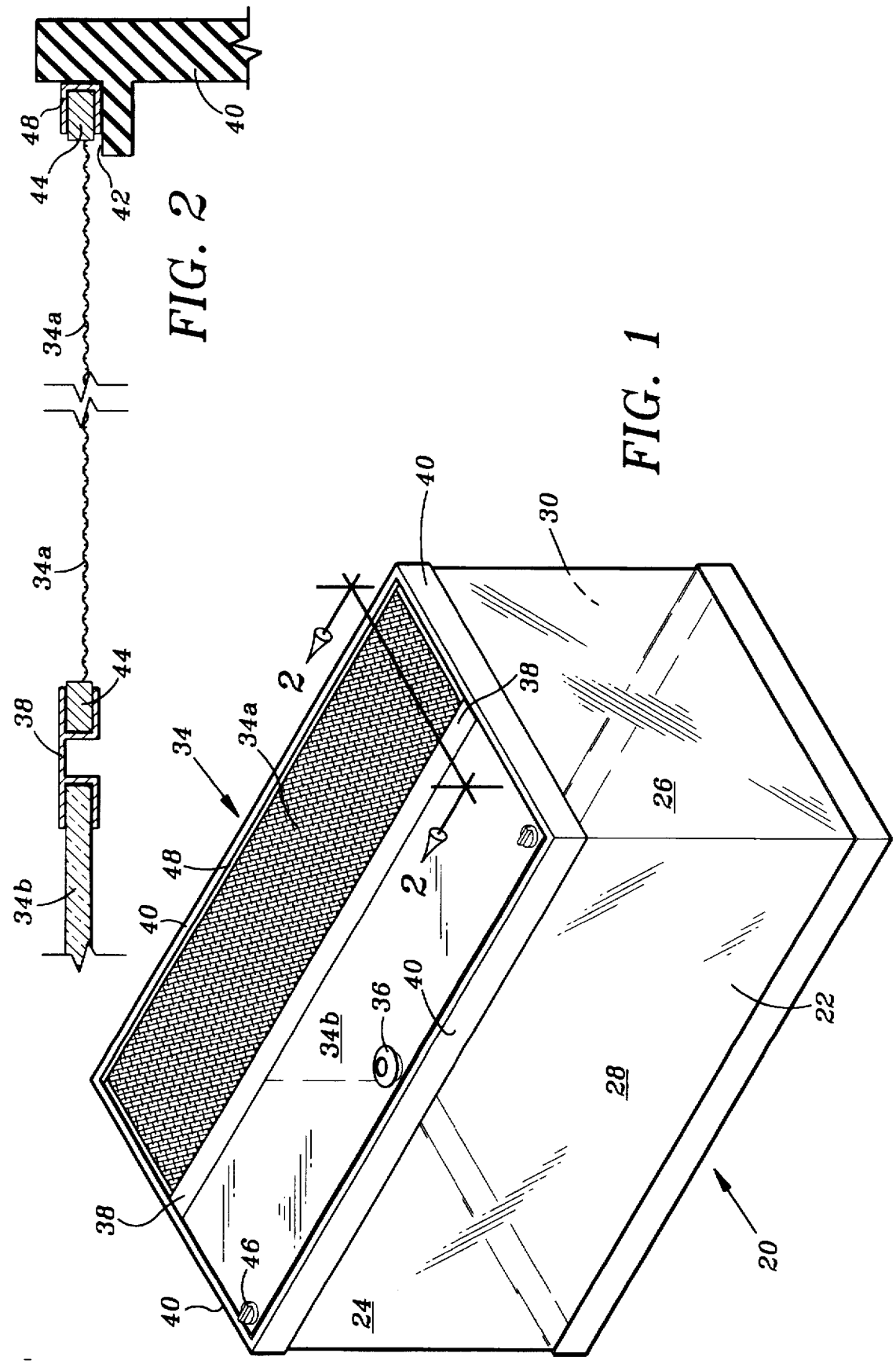

TOP FOR ANIMAL AND PLANT ENCLOSURE

TECHNICAL FIELD OF THE INVENTION

The present invention relates to display enclosures, and more particularly to an enclosure for the display of animals, such as reptiles and amphibians, as well as plants.

BACKGROUND OF THE INVENTION

Enclosures, such as vivariums and terrariums for raising and observing animals and plants, present problems in creating a safe environment for animals and plants. Temperature and humidity needs of animals and plants must be addressed. Additionally, security measures must be built into such enclosures to prevent the escape of animals housed within such enclosures. Therefore, a need has arisen for an enclosure system for creating a safe environment and habitat for animals and plants.

SUMMARY OF THE INVENTION

In accordance with one aspect of the present invention, an enclosure for animals and plants is provided. The enclosure includes a bottom and a side wall. The wall and bottom are interconnected to form a unitary structure. A top for the structure is provided and includes a glass portion and a screen portion. Structure is provided for selectively locking the top to the unitary structure.

BRIEF DESCRIPTION OF THE DRAWINGS

For a more complete understanding of the present invention and for further advantages thereof, reference is now made to the following Description of the Preferred Embodiments taken in conjunction with the accompanying Drawings in which:

FIG. 1 is a perspective view of the present enclosure; and

FIG. 2 is an enlarged partial sectional view taken generally along sectional line 2—2 of FIG. 1.

DESCRIPTION OF THE PREFERRED EMBODIMENTS

Referring to FIG. 1, the present enclosure is illustrated, and is generally identified by the numeral 20. Enclosure 20 may comprise, for example, a vivarium or a terrarium and functions as an enclosure for raising and observing animals or plants to provide a habitat for animals such as, for example, reptiles and amphibians as well as plants. Enclosure 20 includes a bottom 22, end walls 24 and 26, and side walls 28 and 30. An important aspect of enclosure 20 is a top 34. Top 34 is selectively removable and lockable to enclosure 20 to provide security for animals within enclosure 20. Top 34 includes a handle 36 for removal of top 34 from enclosure 20.

Top 34 includes two portions 34a and 34b which are interconnected by a hinge 38 for gaining easy access to the interior of enclosure 20. Portion 34a of top 34 includes a screen for allowing air circulation within enclosure 20. Portion 34b of top 34 may either be constructed of transparent or opaque material and may include, for example, glass or acrylic plastics. Walls 24, 26, 28, and 30 may comprise, for example, transparent material such as glass or acrylic plastics.

Referring simultaneously to FIGS. 1 and 2, disposed around the top of walls 24, 26, 28, and 30 is a molding 40 having a step 42. Top 34 is disposed on step 42 around the perimeter of enclosure 20. Portion 34a of top 34 includes a frame 44 mounted around the perimeter of top portion 34a.

In order to secure portion 34b of top 34 to enclosure 20, locks 46 are provided. Locks 46 engage molding 40, and are further described in U.S. Pat. No. 5,363,801, which disclosure is incorporated herein by reference. An important aspect of the present invention is the use of a locking member 48 for securing portion 34a of top 34 to enclosure 20. Locking member 48 may comprise, for example, a C-channel which is securely affixed to molding 40 adjacent to side wall 30 of enclosure 20. Frame 44 frictionally engages locking member 48 to thereby maintain portion 34a of top 34 selectively engaged with molding 40 adjacent to side wall 30. The opposite side of frame 44 engages hinge 38. Additional locking members may be included along molding 40 adjacent to walls 24 and 26 in order to lock portion 34a of top 34 to enclosure 20.

In order to remove top 34 from enclosure 20, locks 46 are disengaged from molding 40, and top 34 is pulled forwardly, such that frame 44 of top portion 34a, disengages from locking member 48. Alternatively, top portion 34b of top 34 may be disengaged from molding 40 and folded along hinge 38 to a position adjacent to portion 34a of top 34 while top 34a engages molding 40. In this manner, access to enclosure 20 may be gained through top 34 while top 34 remains attached to enclosure 20.

Whereas the present invention has been described with respect to specific embodiments thereof, it will be understood that various changes and modifications will be suggested to one skilled in the art and it is intended to encompass such changes and modifications as fall within the scope of the appended claims.

I claim:

1. An enclosure for animals and plants comprising:
   a bottom;
   a side wall;
   said side wall and said bottom being interconnected to form a unitary structure;
   a top for said unitary structure;
   said top including a first portion and a second portion, said first and second portions being hingedly interconnected, and wherein said first portion includes a screen;
   means for selectively locking said first and second portions of said top to said unitary structure;
   a molding interconnected to said wall adjacent said top, such that said locking means engages said molding; and
   said locking means includes a C-channel attached to said molding for receiving said screen of said top.

2. The enclosure of claim 1 wherein said second portion of said top comprises transparent material.

3. The enclosure of claim 1 wherein said second portion of said top comprises opaque material.

* * * * *